United States Patent [19]
Ruppert et al.

[11] Patent Number: 5,286,072
[45] Date of Patent: Feb. 15, 1994

[54] PIPE CONNECTION FOR HIGH PRESSURE APPLICATION

[76] Inventors: Hans-Peter Ruppert, Gottfried-Kinkel-Strasse 5, D-6200 Wiesbaden; Ernst Wendorff, Waldstrasse 1, D-6204 Taunusstein 4, both of Fed. Rep. of Germany

[21] Appl. No.: 843,515

[22] Filed: Feb. 28, 1992

[30] Foreign Application Priority Data

Feb. 28, 1991 [DE] Fed. Rep. of Germany ... 9102381[U]

[51] Int. Cl.[5] .................. F16L 33/00; F16L 47/00; F16L 49/00
[52] U.S. Cl. .................. 285/247; 285/249; 285/255
[58] Field of Search .............. 285/246, 247, 249, 255, 285/328, 332.4, 334.3, 334.4, 423

[56] References Cited

U.S. PATENT DOCUMENTS 2,000,481  5/1935  Harrison ................. 285/248
2,268,020  12/1941  Dahlstrom ................. 285/249 X
2,880,020  3/1959  Audette ................. 285/255

FOREIGN PATENT DOCUMENTS 2253182  6/1975  France ................. 285/247
2373012  8/1978  France ................. 285/249
288215   3/1965  Netherlands ................. 285/247
352888   4/1961  Switzerland ................. 285/247

*Primary Examiner*—Neill R. Wilson
*Attorney, Agent, or Firm*—Gifford, Groh, Sprinkle, Patmore and Anderson

[57] ABSTRACT

In a pipe connection, in particular for plastic pipes and hoses (2, 9), having a support portion (6) disposed in the interior of the pipe to be connected, and a clamping means (4, 5, 21, 22) which is provided on the outside of the pipe and which comprises a sealing portion (4) and a pressure-applying portion (5), the sealing portion (4) is made from a yielding material, preferably plastic material, and the pressure-applying portion (5) comprises metal, the pressure-applying portion (5) externally surrounding the sealing portion (4).

13 Claims, 2 Drawing Sheets

PIPE CONNECTION FOR HIGH PRESSURE APPLICATION

BACKGROUND OF THE INVENTION

1. Field of the Invention

The invention concerns a pipe connection, in particular for plastic pipes and hoses, comprising a support portion disposed in the interior of the pipe to be connected, and a clamping means which is provided on the outside of the pipe and which comprises a sealing portion and a pressure-applying portion.

2. Description of the Prior Art

It is known for plastic pipes, in particular comprising hard polyamide, to be connected together by screw means, insofar as a cutting ring which is carried in the screw means is impressed into the pipe material thereby providing the necessary adhesion or bond to the end portion of the pipe.

It has been found however that pipe connections of that kind no longer operate satisfactorily when subjected to substantial pressures. On the one hand, it is necessary for the screw means to be tightened with a very great amount of force in order for the cutting ring to be pressed deeply into the material, so that expensive and complicated tools are required, and often there is not sufficient space to operate therewith. On the other hand limits are imposed by virtue of the fact that, when higher pressures are applied, the cutting ring shears off the material and thus the pipe connection comes apart.

An arrangement has therefore already been proposed, comprising a support portion which is provided with support surfaces and which is disposed in the interior of the pipe to be connected, and a clamping means which has pressing surfaces which co-operate with the support surfaces of the support portion.

Pipe connections of that kind operate satisfactorily but leaks may occur when the connection is subjected to high pressures and problems related to the material involved arise when using plastic material.

SUMMARY OF THE PRESENT INVENTION

The object of the present invention is therefor that of providing an improved pipe connection which ensures an enhanced degree of sealing integrity even when high pressures are involved and which provides for the use of plastic materials.

The invention provides that the sealing portion is made from plastic material, preferably a thermoplastic or thermosetting material, and the pressure-applying portion comprises a comparatively hard material and the pressure-applying portion externally surrounds the sealing portion.

In an advantageous feature the sealing portion has projections which face inwardly towards the pipe.

In an advantageous embodiment, the projects are formed by mutually alternate sections which are at an angle of inclination of 10° and 20° relative to the axis of the pipe to be connected.

In that respect, a further development is characterised in that, as viewed from the pipe end, the sealing portion has a first section A' at an inclination of 22°, a second section B at an inclination of 10°, a third section whose first part extends parallel to the axis of the pipe and which is followed by a second part which is at an inclination of 22°, and that in turn adjoining same is a section at an inclination of 10°, in turn followed by a section corresponding to the second section, etc.

In that arrangement, the contours of the sections at an inclination of 10° are advantageously disposed on a straight line.

A further development is distinguished in that the projections are arranged to lie with flat surface portions thereof on a straight line and that grooves are provided between the surface portions. The projections may also be formed by sinusoidal bulge portions.

An embodiment of the invention has the particularity that the sealing portion has sealing surfaces provided with projections at its oppositely disposed ends, the sealing surfaces extending inclinedly outwardly from the spaced-apart pipe ends, wherein the sealing portion can represent a duct portion between the spaced-apart pipe ends.

In accordance with a development of the invention ends of the connecting portion may also extend inclinedly outwardly, while the pressure-applying portions taper in a corresponding fashion so that the inclinedly extending surfaces of the pressure-applying portions apply a contact pressure, in a wedge-like manner, against the inclinedly extending outside surfaces of the sealing portions.

A development of the invention provides that a screwthreaded pin extends from the outer end of the one pressure-applying portion through the sealing portion to the outer end of the other pressure-applying portion and that nuts external to the pressure-applying portions cause them to bear against an inclinedly extending surface of the pipes to be connected, and the connecting or sealing portion.

The two pressure-applying portions may also be provided with a screwthread and can be screwed together.

Grooves for O-ring seals may advantageously be provided in the sealing surfaces and pressing surfaces of the sealing portion.

BRIEF DESCRIPTION OF THE DRAWING

The invention will be described in greater detail hereinafter by means of an embodiment with reference to the accompanying drawings in which.

DETAILED DESCRIPTION OF THE PREFERRED EMBODIMENT OF THE PRESENT INVENTION

Figure 1:
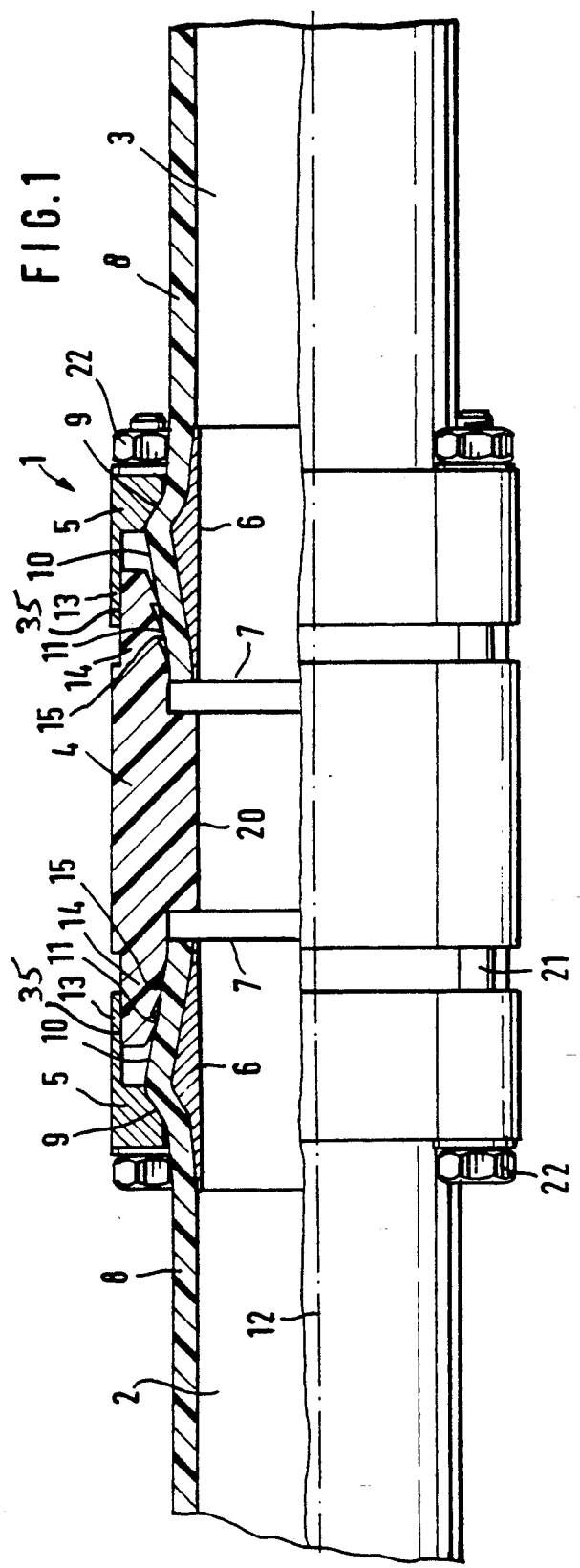
FIG. 1 is a view partly in section of a pipe connection according to the invention.

FIG. 1 shows a pipe connection 1 with which the two plastic pipes 2 and 3 are connected. Provided on the outside of the pipes 2 and 3 is a clamping means comprising a sealing portion 4 and two pressure-applying portions 5. A support portion 6 is disposed in the interior of the pipes 2 and 3 to be connected. The support portion 6 is inserted at the pipe ends 7 of the pipes 2 and 3 to be connected. Preferably the region of the ends 7 of the pipes 2 and 3 is heated by means of a gaseous or liquid medium so that the support portion 6 can be inserted from the pipe end 7. When that is done, the wall of the pipes 2 and 3 to be connected is caused to protrude outwardly in the region of the pipe ends 7, with the formation in the region of each pipe end 7 of a pressure-applying surface 9 facing towards the pipe and a sealing surface 10 which extends inclinedly relative to the pipe end. The inclination of the pressure-applying surface 9 relative to the axis 12 of the pipes 2 and 3, to be connected is greater than the inclination of the sealing surfaces 10.

Arranged between the pipe ends 7 is a sealing portion 4 comprising plastic material. The material may be a flexible or yielding material but preferably it is a plastic material which is as hard as possible and which is a thermoplastic or thermosetting material. The sealing portion 4 has sealing surfaces 11 which are in contact with the sealing surfaces 10 of the pipes. The pressure-applying portions 5 come to bear against the contact surfaces 9 on the pipes. In that respect, the pressure-applying portions 5 are of such a configuration that they externally surround the sealing portion 4. In the present case, the pressure-applying portions 5 have cylindrical extension portions 13 which surround the ends 14 of the sealing portion 4. That provides that the flexible material of the sealing portion 4 cannot move outwardly away from the pipe sealing surface 10. On the contrary, here too the pressure-applying portion 5 applies a certain contact pressure against the sealing portion. In addition, a further sealing action is produced as between the ends 14 of the sealing portion and the cylindrical extension portions 13 of the pressure-applying portion 5, in that the surfaces which bear against each other also act as additional sealing surfaces.

Figure 2:
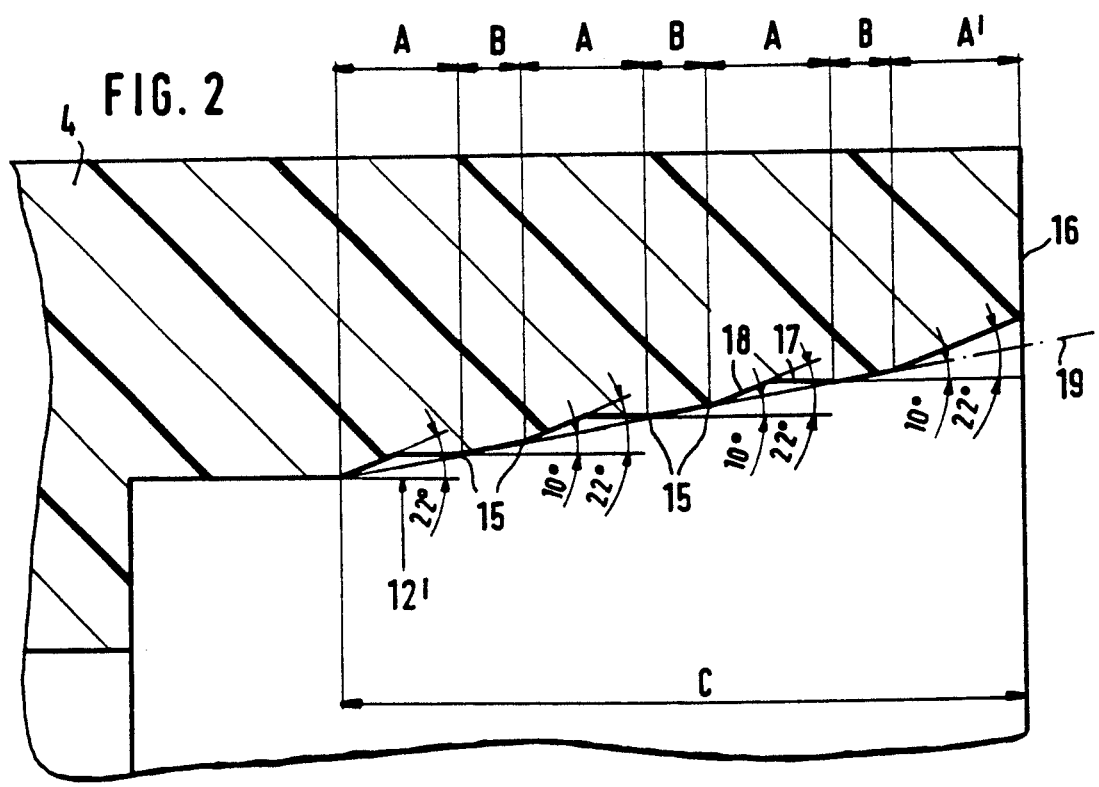
FIG. 2 is a view on an enlarged scale of the pipe end of a sealing portion as shown in FIG. 1.

As can be seen in greater detail from FIG. 2, the sealing portion 4 is provided with projections 15 at its sealing surfaces 11. The projections 15 are formed by alternate sections of the sealing surface 11, which are at an inclination of 10° and 22°. As FIG. 2 shows, starting from the end 16 of the sealing portion 4, there is a first section A' which is at an angle of 22° relative to an axis 12' which is displaced in parallel relationship to the axis 12 of the pipes 2 and 3 to be connected. The section A is followed by a section B which is at an angle of 10° relative to the plane 12'. The section B is followed by a third section A which has a first part 17 extending parallel to the plane 12' and, as viewed from the end 16, adjoined by a second part 18 which, like the first section A', is at an inclination of 22°. That is then again followed alternately by a section B and a further section A until the overall length C of the sealing surface 11 is attained. That arrangement forms projections 15 which increase the sealing effect as between the pipe sealing surface 10 and the sealing surface 11 of the sealing portion 4. The contours of the sections B of the sealing surface 11 of the sealing portion 4 all lie on a straight line which is identified by reference numeral 19.

Figure 3:
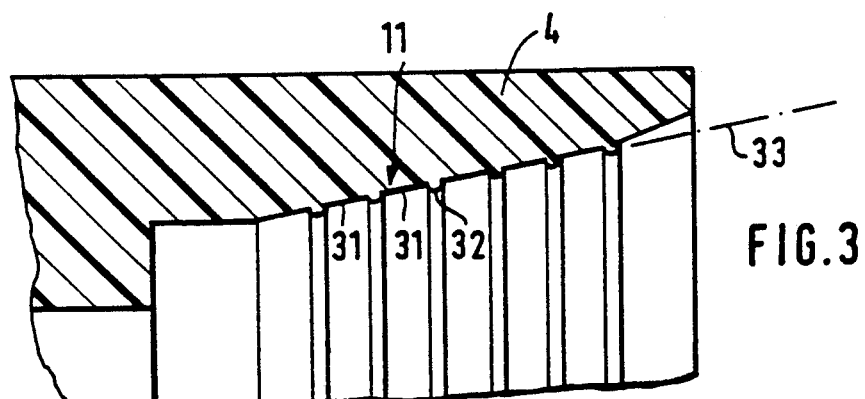
FIG. 3 is a view corresponding to that shown in FIG. 2, illustrating the sealing surface of a modified embodiment.

FIG. 3 shows a further configuration of the sealing portion 4. The sealing surface is provided with surface portions 31, between which are provided ribs 32. The contours of the surface portions lie on a straight line 33 which is inclined outwardly from the pipe end.

Figure 4:
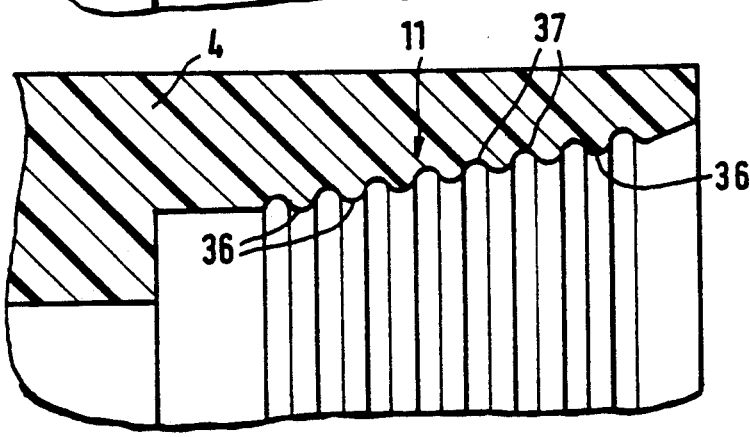
FIG. 4 is a view corresponding to that shown in FIG. 3, with a further modification of the sealing surface.

The modification of the sealing surface 11, of the sealing portion 4, illustrated in FIG. 4, has sinusoidal bulge portions 36 which are connected together by sinusoidal recesses 37 so that the sealing surface 11 is of a sinusoidal configuration approximately along the straight line 33 shown in FIG. 3.

That configuration of the sealing surfaces 11 on the sealing portion 4 provides that the effectively operative pressure-applying surfaces on the projections 15, 32, 36 are smaller than the pressure-applying surface 9 of the support portion 6. With a smaller force, a higher contact pressure is thus generated. On the other hand however there is only a small volume in the pockets formed between the pressure-applying surfaces so that when a rise in temperature occurs, the material can escape to the minimum possible extend. The material of the sealing portion 4 is comparatively soft and can comprise plastic materials or other sealing materials. Due to the relatively small recesses between the projections 15, 32, 36 however the soft material cannot escape to a great degree. In that connection, the soft material of the sealing portion 4 is to have a high level of chemical and physical resistance, in order in particular not to be attacked by the content of the pipe.

The sealing surfaces 11, which are disposed in the region of the ends 16 on the sealing portion 4, extend inclinedly outwardly approximately at the angle of inclination of the sealing surfaces 10 at the inclinedly extending walls of the pipes 2 and 3 to be connected in the region of the pipe ends 7. Between the pipe ends 7 the sealing portion forms a pipe duct portion as indicated at 20.

The pressure-applying portions 5 are held together by screwthreaded pins or bolts 21 which extend from the outer end of the one pressure-applying portion 5 through the sealing portion 4 to the outer end of the other pressure-applying portion 5. Carried on the screwthreaded pins or bolts 21, on the outside, are nuts 22 which cause the pressure-applying portions 5 to bear against the pressure-applying surfaces 9 of the pipes 2 and 3 to be connected and the connecting portion 4. The connecting portions 4 may also extend inclinedly outwardly in the region of the ends 16 while the extension portions 13, of the pressure-applying portions 5, also have inclinedly extending outside surfaces (not shown) so that in that case they apply a contact pressure, in a wedge-like manner, against the sealing portion 4.

Figure 5:
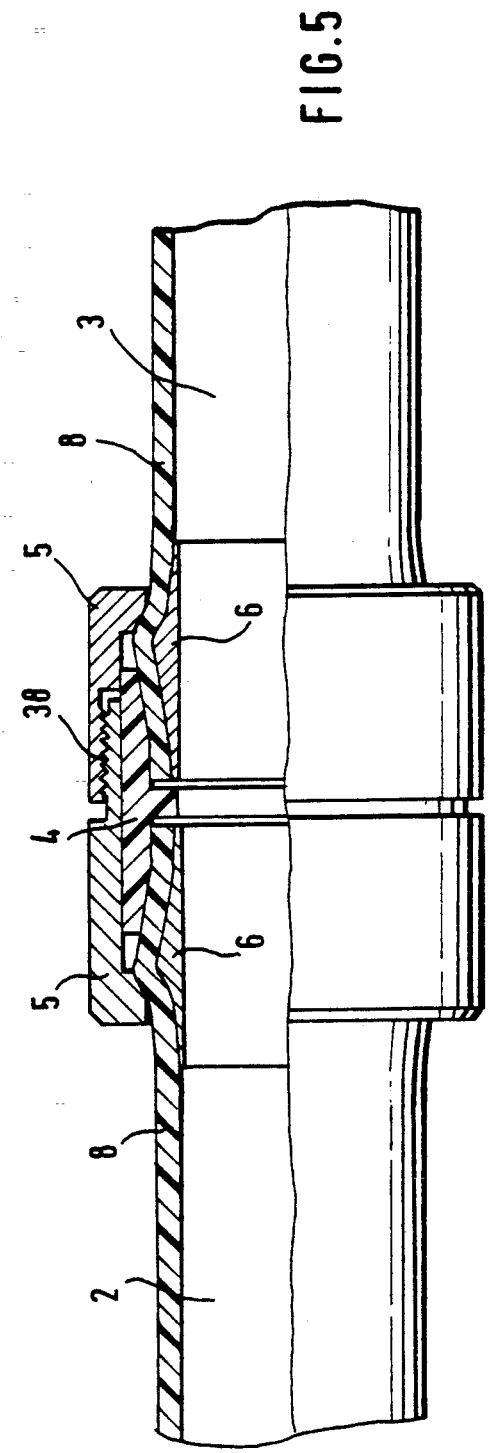
FIG. 5 is a view corresponding to that shown in FIG. 1, wherein the two pressure-applying portions are directly screwed to each other.

The two pressure-applying portions 5 can be screwed to the sealing portion 4 by means of a screwthread 35, as shown in FIG. 1. FIG. 5 shows a modification illustrating that the two pressure-applying portions 5 can be directly screwed together by a screwthread 38.

O-ring seals may be provided at 40, 41, 42 in the sealing surfaces 9, 10 and 11 and in the at 43 between the connection portion 4 and the cylindrical extension portions 13 of the pressure-applying portions 5.

We claim:

1. A pipe connection, for plastic pipes and hoses comprising a support portion disposed in the interior of the pipe to be connected, and a clamping means which is provided on the outside of the pipe and which comprises a sealing portion and a pressure-applying portion, characterized in that the sealing portion is made from a plastic material, which is a thermoplastic or thermosetting material, and the pressure-applying portion comprises a comparatively hard material, and that the pressure-applying portion externally surrounds the sealing portion; said sealing portions further comprising projections facing inwardly toward said pipe, said projections formed by mutually alternate sections which are at an inclination of 10° and 22° relative to the axis of the pipes to be connected.

2. A pipe connection as set forth in claim 1 characterized in that, as viewed form the pipe end (7), the sealing portion (4) has a first section (A') at an inclination of 22°, a second section (B) at an inclination of 10° and a third section (A) whose first part (17) extends parallel to the pipe axis and which is adjoined by a second part (18) which is at an inclination of 22°, and that in turn adjoining same is a section (B) at an inclination of 10°, in turn followed by a section (A) at the inclination of 22°, etc.

3. A pipe connection as set forth in claim 2 characterized in that the contours of the sections (B) at an inclination of 10° lie on a straight line (19).

4. A pipe connection as set forth in claim 1 characterised in that the projections (15) are of a flat configuration and lie on a straight line and that ribs (32) are provided between the surface portions (31).

5. A pipe connection as set forth in claim 1 characterized in that the projections (15) are formed by sinusoidal bulge portions (36).

6. A pipe connection as set forth in claim 1 characterized in that the sealing portion (4) has two sealing surfaces (11) which are provided at its oppositely disposed ends (16) with projections (15) and which extend inclinedly outwardly from the spaced-apart pipe ends (7).

7. A pipe connection as set forth in claim 1, said sealing portion further comprising a pocket volume formed between said projections, wherein said pocket volume is small so that the material of the sealing portion can escape only to an inmaterial degree.

8. A pipe connection as set forth in claim 7 characterized in that the sealing portion (4) presents a pipe duct portion (20) between the spaced-apart pipe ends (7).

9. A pipe connection as set forth in claim 1 wherein said projections further present a pressure-applying surface area that is smaller than a surface area of said pressure-applying portion.

10. A pipe connection as set forth in claim 1 characterized in that a screwthreaded pin (21) extends from the outer end of one pressure-applying portion (5) through the sealing portion (4) to the outer end of the other pressure-applying portion (15) and that nuts (22) external to the pressure-applying portions (15) cause them to bear against an inclinedly extending surface (9) of the pipes (2, 3) to be connected, and the connection portion (4).

11. A pipe connection as set forth in claim 1 characterized in that the two pressure-applying portions (15) are provided with screwthreads (35, 38) and can be screwed to each other.

12. A pipe connection as set forth in claim 1 characterized in that the ends of the connection portion (4) extend inclinedly outwardly and the pressure-applying portions (5) correspondingly taper so that the inclinedly extending surfaces of the pressure-applying portions (5) apply wedge-like a contact pressure force to the inclinedly extending outside surfaces of the sealing portion(4).

13. A pipe connection as set forth in claim 1 characterized in that said sealing surfaces further comprise means for supporting O-ring seals between the wall of the pipes to be connected and the sealing portion, and in the sealing surfaces between the sealing portion and the extension portions of the pressure-applying portions, and in the pressure-applying surfaces.

* * * * *